United States Patent
Yamada et al.

(10) Patent No.: US 11,247,569 B2
(45) Date of Patent: Feb. 15, 2022

(54) DAMPING CONTROL DEVICE FOR ELECTRIC VEHICLE

(71) Applicant: SUBARU CORPORATION, Tokyo (JP)

(72) Inventors: Keigo Yamada, Tokyo (JP); Shogo Machida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 16/837,217

(22) Filed: Apr. 1, 2020

(65) Prior Publication Data
US 2020/0384867 A1 Dec. 10, 2020

(30) Foreign Application Priority Data
Jun. 6, 2019 (JP) .............................. JP2019-106039

(51) Int. Cl.
*B60L 15/20* (2006.01)
*B60W 30/20* (2006.01)
(Continued)

(52) U.S. Cl.
CPC .............. *B60L 15/20* (2013.01); *B60W 30/20* (2013.01); *H02P 23/04* (2013.01);
(Continued)

(58) Field of Classification Search
CPC ... B60L 15/20; B60L 2240/423; B60W 30/20; B60W 20/00; B60W 2050/0052; Y02T 10/62; Y02T 10/64; B60K 6/543
See application file for complete search history.

(56) References Cited

U.S. PATENT DOCUMENTS

| 2014/0107877 A1* | 4/2014 | Bang ....................... B60L 15/20 701/22 |
| 2015/0012160 A1* | 1/2015 | Tsutsumi .................. B60L 3/12 701/22 |

(Continued)

FOREIGN PATENT DOCUMENTS

JP 2000-217209 A 8/2000

OTHER PUBLICATIONS

Rodriguez et al.; Active vibration control for electric vehicle compliant drivetrains; IECON 2013—39th Annual Conf. of the IEEE Industrial Electronics Society; 2013; pp. 2590-2595 (Year: 2013).*

*Primary Examiner* — Michael J Zanelli
(74) *Attorney, Agent, or Firm* — McGinn IP Law Group, PLLC

(57) ABSTRACT

A damping control device for an electric vehicle including a motor and a transmission in a drive system between the motor and a drive wheel includes a detector, a bandpass filter, first to third calculators, and a controller. The detector detects a rotation speed of the motor. The bandpass filter passes a vibration component included in the detected motor rotation speed, in a resonance frequency band of the drive system. The first calculator calculates a damping torque for damping resonance of the drive system with a motor torque, based on the passed vibration component. The second calculator calculates, as a damping torque offset value, an average value of the calculated damping torque for a predetermined time. The third calculator calculates a target damping torque. The controller controls a drive state of the motor.

5 Claims, 5 Drawing Sheets

(51) Int. Cl.
  *H02P 23/04*    (2006.01)
  *B60W 20/00*   (2016.01)
(52) U.S. Cl.
  CPC ........ *B60L 2240/423* (2013.01); *B60W 20/00* (2013.01); *Y02T 10/62* (2013.01); *Y02T 10/64* (2013.01)

(56) References Cited

U.S. PATENT DOCUMENTS

2016/0221467 A1* 8/2016 Suzuki .................. B60L 3/12
2016/0221468 A1* 8/2016 Suzuki .................. B60L 3/106

* cited by examiner

DAMPING CONTROL DEVICE FOR ELECTRIC VEHICLE

CROSS-REFERENCE TO RELATED APPLICATIONS

The present application claims priority from Japanese Patent Application No. 2019-106039 filed on Jun. 6, 2019, the entire contents of which are hereby incorporated by reference.

BACKGROUND

The disclosure relates to a damping control device for an electric vehicle, and particularly to a damping control device for an electric vehicle including a transmission in a drive system between a motor and a drive wheel.

In an electric vehicle using a motor (an electric motor) as a drive source, resonance occurs due to elasticity (torsion) of a drive system between a motor and a drive wheel. For example, Japanese Unexamined Patent Application Publication (JP-A) No. 2000-217209 describes a damping control device for such an electric vehicle. The damping control device includes a plant model, a feedforward controller, and a feedback corrector. The plant model has a transfer function approximated to a transfer function of an actual plant that is a drive system between the motor and the drive wheel. The feedforward controller sets an input motor torque to the actual plant and the plant model. The feedback corrector estimates a disturbance torque based on a difference between an output value (for example, revolution speed) of the actual plant and an output value (for example, revolution speed) of the plant model, and corrects the input motor torque input to the actual plant based on the disturbance torque. In the damping control device, an inverse function of the transfer function of the plant model constitutes the feedforward controller, so that a resonance component of the drive system is removed from the input motor torque. Therefore, a disturbance can be obtained based on the difference between the output value of the plant model and the output value of the actual plant.

SUMMARY

An aspect of the disclosure provides a damping control device for an electric vehicle. The electric vehicle includes a motor as a vehicle drive source and a transmission disposed in a drive system between the motor and a drive wheel. The damping control device includes a detector, a bandpass filter, a first calculator, a second calculator, a third calculator, and a controller. The detector is configured to detect a revolution speed of the motor. The bandpass filter is configured to pass a vibration component in a resonance frequency band of the drive system. The vibration component is included in the detected motor revolution speed. The first calculator is configured to calculate a damping torque for damping resonance of the drive system with a motor torque, on a basis of the vibration component passed by the bandpass filter. The second calculator is configured to calculate, as a damping torque offset value, an average value of the calculated damping torque for a predetermined time period. The third calculator is configured to calculate, as a target damping torque of the motor torque, a value obtained by subtracting the calculated damping torque offset value from the calculated damping torque. The controller is configured to control a drive state of the motor so as to achieve a target motor torque added with the calculated target damping torque.

An aspect of the disclosure provides a damping control device for an electric vehicle. The electric vehicle includes a motor as a vehicle drive source and a transmission disposed in a drive system between the motor and a drive wheel. The damping control device includes a detector, a bandpass filter, and circuitry. The detector is configured to detect a revolution speed of the motor. The bandpass filter is configured to pass a vibration component in a resonance frequency band of the drive system. The vibration component is included in the detected motor revolution speed. The circuitry is configured to calculate a damping torque for damping resonance of the drive system with a motor torque, on a basis of the vibration component passed by the bandpass filter. The circuitry is configured to calculate, as a damping torque offset value, an average value of the calculated damping torque for a predetermined time period. The circuitry is configured to calculate, as a target damping torque of the motor torque, a value obtained by subtracting the calculated damping torque offset value from the calculated damping torque. The circuitry is configured to control a drive state of the motor so as to achieve a target motor torque added with the calculated target damping torque.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

The inverse function of the transfer function of the plant model constituting the feedforward controller described in JP-A No. 2000-217209 includes a transmission gear ratio of a transmission disposed in a drive system. However, when the transmission transmits a driving force by, for example, a belt (which may include a chain) and the transmission gear ratio is continuously changed, a resonance frequency of the drive system changes according to the transmission gear ratio. If the damping control device described in JP-A No. 2000-217209 is applied to an electric vehicle including a belt driving force transmission disposed in the drive system, a plant model having different transfer functions for respective transmission gear ratios that are continuously changed is to be prepared, so that the practicality is low for such an electric vehicle. Even if the transmission is a multi-stage transmission, a plant model having different transfer functions for respective transmission gear ratios is to be prepared.

When an engine having a large mass is coupled to a drive system, the engine can absorb the resonance of the drive system. However, when the engine is not coupled to the drive system and a motor having a small mass is simply coupled to the drive system, it is difficult for the motor to absorb the resonance of the drive system, so that there arises a problem that the resonance of the drive system easily affects the riding comfort on a vehicle.

It is desirable to provide a damping control device for an electric vehicle that can appropriately reduce resonance of a drive system even in an electric vehicle including a transmission disposed in a drive system.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
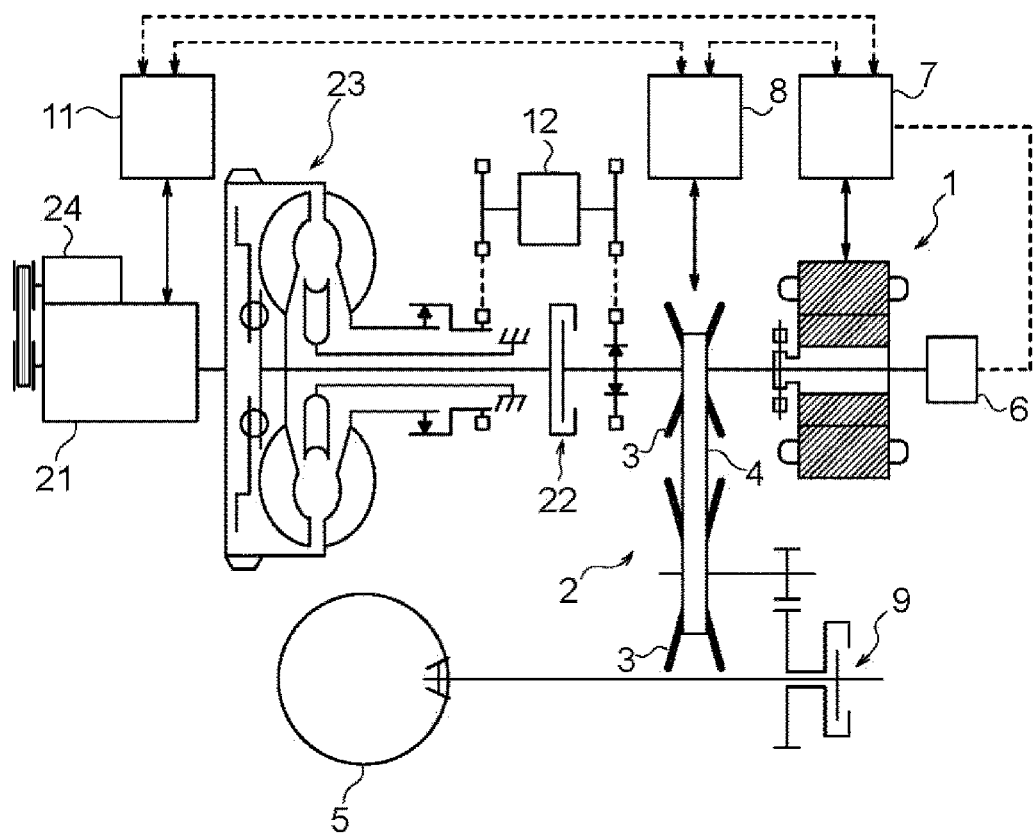
FIG. 1 is a schematic configuration diagram illustrating an embodiment of a hybrid vehicle including a damping control device for an electric vehicle according to an embodiment of the disclosure.

FIG. 1 is a schematic configuration diagram illustrating an electric vehicle having the damping control device according to the embodiment. This electric vehicle is a hybrid vehicle. FIG. 1 schematically illustrates a power train of the hybrid vehicle. In one embodiment, the power train may serve as a "drive system". The hybrid vehicle includes an engine 21 and a motor 1 for driving the vehicle, similarly to existing hybrid vehicles. The hybrid vehicle according to the embodiment has a configuration in which the motor 1 is coupled to a drive wheel 5 via the drive system unless an output clutch 9 described later is decoupled, and the engine 21 is coupled to and decoupled from the drive system. As is well known, the motor 1 is used not only as a motor (electric motor) but also as a generator that recovers electric power for a driving battery (not illustrated). The motor 1 is simply referred to as a motor here. FIG. 1 simply illustrates one drive wheel 5. It is noted that the number of the drive wheel 5 may be two or four.

An output shaft of the motor 1 is coupled to a belt driving force transmission (hereinafter, referred to as a continuously variable transmission (CVT)) 2. An output shaft of the CVT 2 is coupled to the drive wheel 5 via the output clutch 9. The motor 1 is driven by the electric power supplied from the driving battery (not illustrated), and regenerates power using rotations of the drive wheel 5 to store the power in the driving battery. In FIG. 1, the illustration of a drive circuit such as an inverter is omitted. The CVT 2 can continuously change a transmission gear ratio between the input shaft and the output shaft by changing a contact radius between a belt (including a chain) 4 and a pulley 3. In FIG. 1, the belt 4 and the pulley 3 are illustrated, but the illustration of a step motor and a hydraulic mechanism that operates a movable sheave of the pulley 3 is omitted. A combination of the belt 4 and the pulley 3 is called a variator. A motor revolution speed sensor 6 is attached to the motor 1. The motor revolution speed sensor 6 detects a revolution speed (rotational speed) of the output shaft.

A torque converter 23 is coupled to an input shaft of the CVT 2 via an input clutch 22. An output shaft of the engine 21 is coupled to an input shaft of the torque converter 23. Therefore, when the input clutch 22 is decoupled, the engine 21 is decoupled from the drive system. The torque converter 23 includes a lock-up mechanism. The engine 21 is started by an integrated starter 24 for a hybrid vehicle. A mechanical oil pump 12 is coupled to the input shaft of the CVT 2. In addition, an electric oil pump (not illustrated) is mounted on the vehicle.

In the hybrid vehicle according to the embodiment, similarly to recent vehicles, an operating state of the engine 21 is controlled by an engine control unit 11, an operating state of the motor 1, for example, a power running operation or a regenerative operation, is controlled by a power control unit 7, and an operating state of the CVT 2, for example, control of the transmission gear ratio, is controlled by a CVT control unit 8. The engine control unit 11, the power control unit 7, and the CVT control unit 8 may be integrated into an integrated control unit that controls the vehicle. A battery control unit may be provided that controls the driving battery (not illustrated). In the hybrid vehicle, when the engine 21 is coupled to the drive system, as is well known, the engine 21 and the motor 1 are cooperatively controlled.

For example, a target drive torque is set according to an accelerator pedal depression amount by a driver and a traveling speed of the vehicle. A target motor torque is set according to, for example, a state of charge (SOC) of the driving battery. A value obtained by subtracting the target motor torque from the target drive torque is set as a target engine torque. The engine control unit 11 controls the operating state of the engine 21 so as to achieve the target engine torque. Similarly, the power control unit 7 controls the operating state of the motor 1 so as to achieve the target motor torque. However, in the embodiment, a target damping torque described later is added to the target motor torque, and the power control unit 7 controls the operating state of the motor 1 so as to achieve the target motor torque added with the target damping torque.

The control units such as the power control unit 7 and the engine control unit 11 include a computer system such as a microcomputer. Similar to a well-known computer system, the computer system includes, for example, a storage device that stores a program, and an input/output device that reads a sensor signal and performs mutual communication with another control unit, in addition to an arithmetic processing device having an advanced arithmetic processing function.

Figure 2:
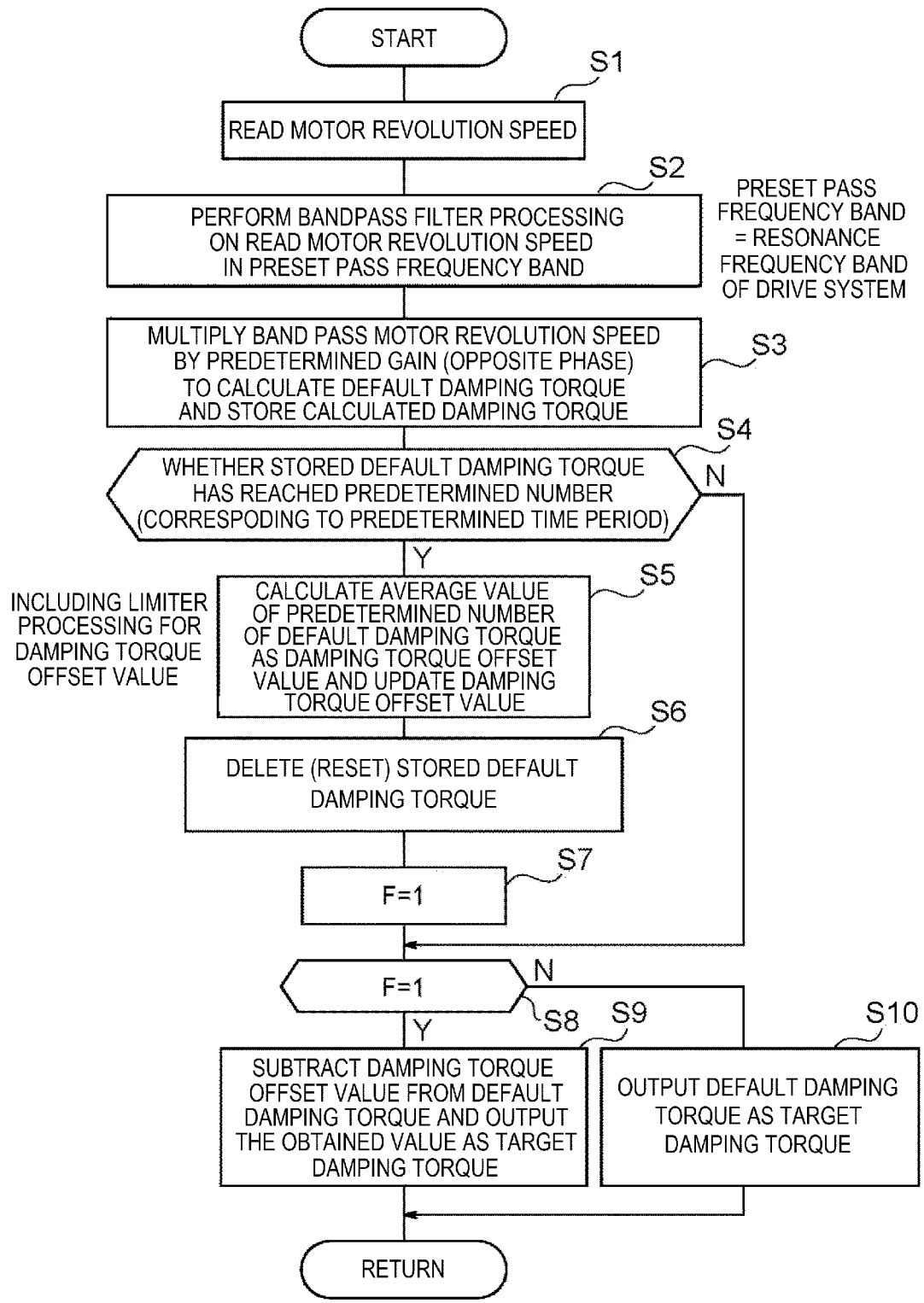
FIG. 2 is a flowchart of arithmetic processing performed by a power control unit of FIG. 1.

FIG. 2 is a flowchart illustrating arithmetic processing for calculating and setting the target damping torque. The arithmetic processing is performed by the power control unit 7. The arithmetic processing is, for example, timer interrupt processing that is performed in a predetermined sampling cycle. A control flag F in the flowchart is reset to 0 when, for example, the vehicle stops for a predetermined time period or longer. In the arithmetic processing, first, in step S1, a motor revolution speed detected by the motor revolution speed sensor 6 is read.

Next, the processing proceeds to step S2. Bandpass filter processing with a preset pass frequency band is performed on the motor revolution speed read in step S1, so as to obtain a vibration component included in the motor revolution speed as a band-pass motor revolution speed. The bandpass filter processing is implemented by, for example, a well-known digital bandpass filter. The preset pass frequency band of the bandpass filter is a resonance frequency band of the drive system. In a hybrid vehicle including the CVT 2 (belt driving force transmission) disposed in the drive system as in the embodiment, a resonance frequency of the drive system changes according to a transmission gear ratio of the CVT 2 as will be described later. Thus, a frequency band corresponding to a variation range of the resonance frequency of the drive system is set as the pass frequency band. An output signal of the motor revolution speed sensor 6 may be transmitted to an equivalent bandpass filter, so as to obtain the band-pass motor revolution speed in the resonance frequency band of the drive system.

Next, the processing proceeds to step S3. The band-pass motor revolution speed obtained in step S2 is multiplied by a predetermined gain, so as to calculate a default damping torque. The calculated default damping torque is stored in a predetermined storage area of the storage device. As will be described in detail later, the band-pass motor revolution speed is a resonance component of the drive system excluding a vehicle acceleration and deceleration component included therein. Therefore, a vibration component thereof having an opposite phase is a damping control vibration for reducing resonance of the drive system. A torque obtained by converting the vibration component into a motor torque is the default damping torque.

Next, the processing proceeds to step S4. It is determined whether the number of default damping torques calculated and stored in step S3 has reached a predetermined number corresponding to the predetermined time period. When the stored default damping torques for the predetermined time period are stored (accumulated), the processing proceeds to step S5; otherwise, the processing proceeds to step S8. The predetermined time period is set to a time period longer than ½ of a maximum cycle (maximum resonance cycle) corresponding to a minimum frequency of the pass frequency band of the bandpass filter among the resonance cycles of the drive system. The predetermined time period is desirably longer than the maximum resonance cycle.

In step S5, an average value of the predetermined number of default damping torques for the predetermined time period is calculated as a damping torque offset value. The predetermined storage area of the storage device is updated with the calculated damping torque offset value. Then, the processing proceeds to step S6. The calculation of the damping torque offset value includes limiter processing for limiting the damping torque offset value within predetermined upper and lower limit values.

In step S6, all the default damping torques stored in the predetermined storage area of the storage device are deleted (reset). The processing proceeds to step S7.

In step S7, the control flag F is set to 1. The processing proceeds to step S8.

In step S8, it is determined whether the control flag F is set to 1. When the control flag F is set to 1, the processing proceeds to step S9; otherwise, the processing proceeds to step S10.

In step S9, a value obtained by subtracting the damping torque offset value updated in step S5 from the default damping torque calculated in step S3 is output as the target damping torque. The processing returns.

In step S10, the default damping torque calculated in step S3 is output as the target damping torque. The processing returns.

According to the arithmetic processing, a drive-system resonance frequency component of the motor revolution speed (rotational speed) is extracted, and the default damping torque including the opposite-phase vibration component is set and stored. When the default damping torque for the predetermined time period is accumulated, the damping torque offset value is set based on the average value thereof.

Thereafter, the damping torque offset value is updated every predetermined time period, for example, until the vehicle stops. Then, a value obtained by subtracting the damping torque offset value from the default damping torque calculated in each predetermined sampling cycle of the arithmetic processing is set as the target damping torque. The power control unit 7 controls the operating state of the motor 1 so as to achieve the target motor torque added with the target damping torque.

Figure 3:
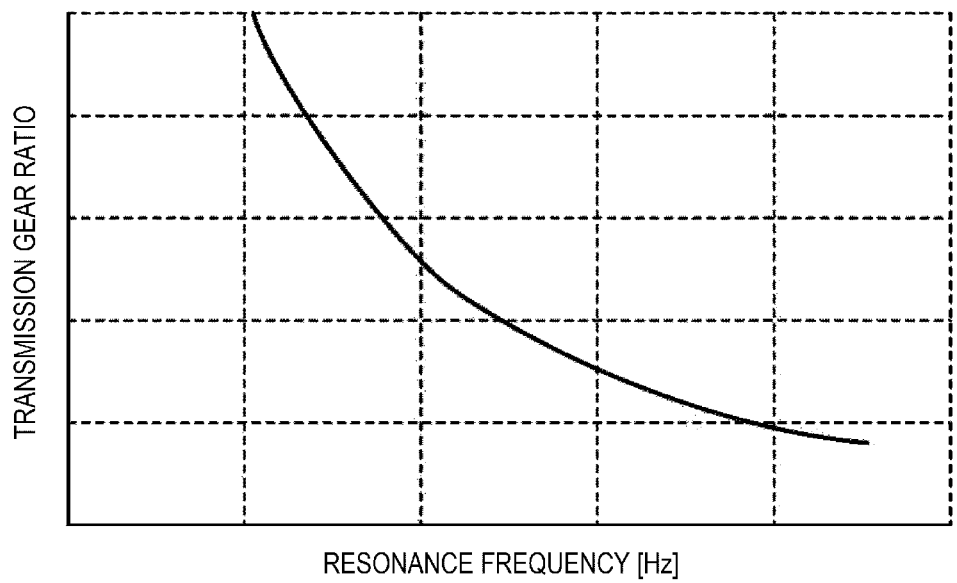
FIG. 3 is a diagram illustrating a resonance frequency of a drive system in the hybrid vehicle of FIG. 1.

FIG. 3 is a diagram illustrating a relationship between the transmission gear ratio of the CVT 2 and the resonance frequency of the drive system. As clearly illustrated in FIG. 3, the resonance frequency of the drive system decreases as the transmission gear ratio of the CVT 2 increases, and the resonance frequency of the drive system increases as the transmission gear ratio decreases. This is because, for example, the inertia of the input and output shafts changes along with shift of the CVT 2. Therefore, by setting the pass frequency band of the bandpass filter (processing) to have a frequency band corresponding to a variation range of the resonance frequency, a variation of the vibration component of the motor revolution speed corresponding to the resonance frequency band of the drive system can be extracted as the band-pass motor revolution speed. For the reason described later, the predetermined time period for calculating and setting the damping torque offset value is set to a time period longer than ½ of the maximum resonance cycle (=1/minimum resonance frequency) in the resonance frequency band, and may be a time period longer than the maximum resonance cycle.

The resonance of the drive system occurs due to a torsion of an elastic element in the drive system and a torsion return thereof. The resonance of the drive system is a wave having an amplitude of about 0. Therefore, an average value of the amplitude per predetermined time period is 0 or about 0. A phase difference between the resonance of the drive system and the variation of the motor revolution speed with the resonance is zero. On the other hand, the band-pass motor revolution speed passed by the bandpass filter includes the acceleration and deceleration component of the vehicle. Therefore, the default damping torque including an opposite-phase component of the band-pass motor revolution speed contains a component that prevents acceleration and deceleration of the vehicle. Here, the default damping torque for the predetermined time period is averaged to set a component that damps the resonance of the drive system to 0 or about 0. Then, the damping torque offset value which is the average value of the default damping torque serves as an acceleration and deceleration prevention component of the vehicle at that time point. Accordingly, the target damping torque obtained by subtracting the damping torque offset value from the default damping torque becomes a motor torque component that simply damps the resonance of the drive system without preventing the acceleration and deceleration of the vehicle.

Here, in a case where the predetermined time period for calculating and setting the damping torque offset value is equal to or shorter than ½ of the maximum resonance cycle, for example, when the default damping torque includes no acceleration and deceleration prevention component of the vehicle, the average value of the default damping torque simply including a torsion component or a torsion return component of the drive system may be calculated. The target damping torque obtained by subtracting the obtained damping torque offset value from the default damping torque may rather vibrate the drive system. To the contrary, by setting the predetermined time period for calculating the damping torque offset value to be longer than at least ½ of the resonance cycle of the drive system, it is possible to set the average value of the damping torque for simply damping the resonance component of the drive system to be close to 0. Therefore, a target damping torque capable of surely reducing the resonance of the drive system can be set. Further, as conceivable from the above description, in some embodiments, the predetermined time period for calculating the damping torque offset value is longer than the maximum resonance cycle of the drive system.

Figure 4:
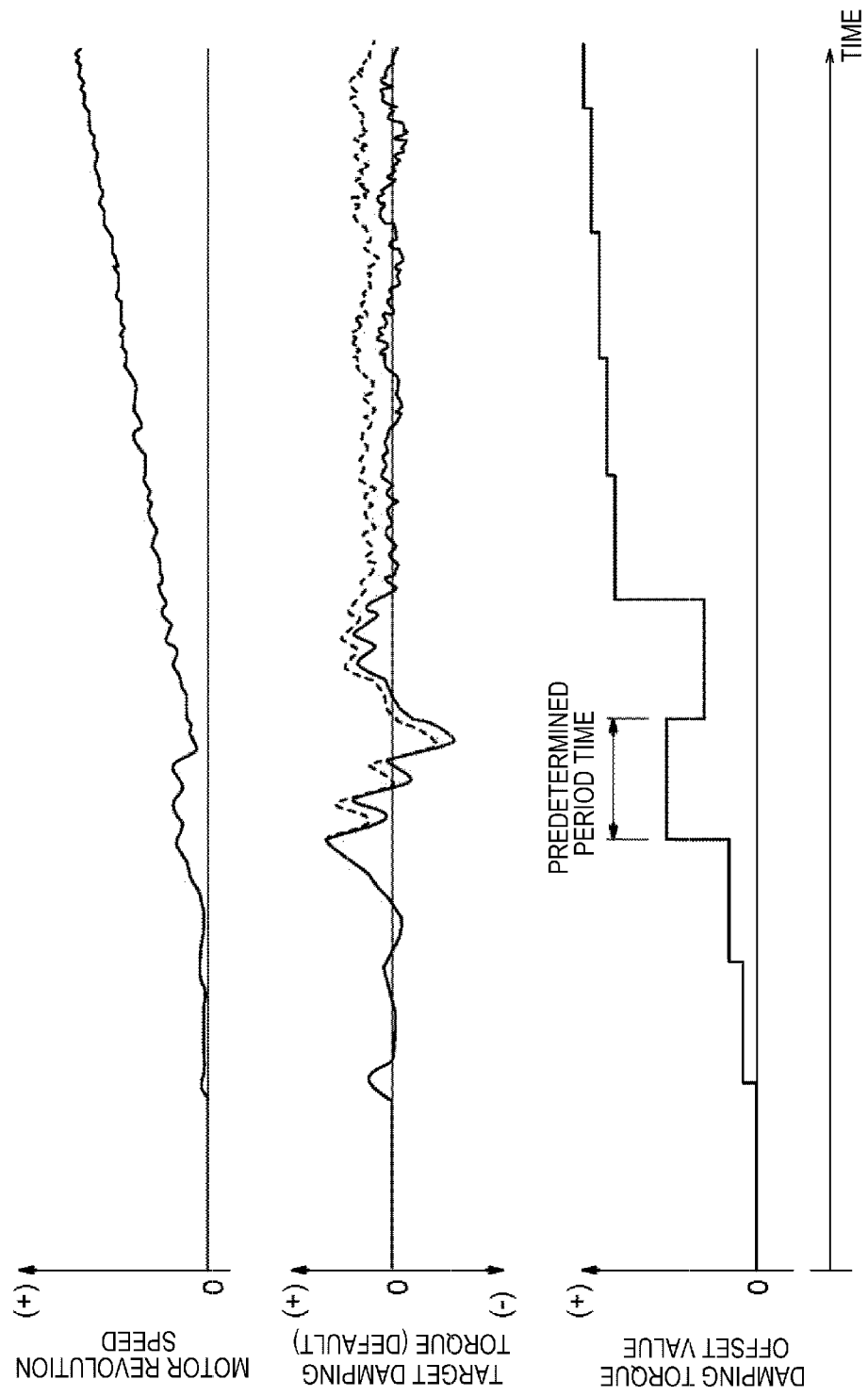
FIG. 4 is a timing chart illustrating operations of the arithmetic processing of FIG. 2.

FIG. 4 is a timing chart illustrating the target damping torque (default damping torque) and the damping torque offset value which are calculated in the arithmetic processing of FIG. 2. In the timing chart, simulated is a state where the vehicle in which the engine 21 of FIG. 1 is decoupled from the drive system stops and is then accelerated at a substantially constant acceleration. In the middle part of FIG. 4, a broken line indicates the default damping torque, and a solid line indicates the target damping torque. As described above, in the simulation, the default damping torque including the acceleration and deceleration prevention component of the vehicle is biased in a positive direction so as to prevent the acceleration of the vehicle. However, the target damping torque obtained by subtracting the damping torque offset value from the default damping torque vibrates at about 0 Nm. It is predicted that the target damping torque damps resonance due to a torsional vibration of the drive system.

Figure 5:
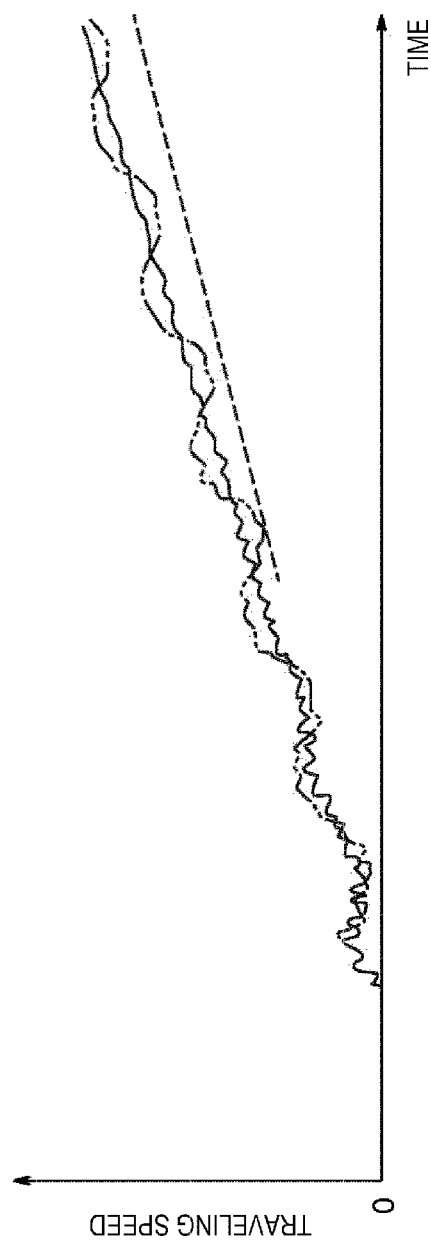
FIG. 5 is a timing chart illustrating the operations of the arithmetic processing of FIG. 2.

FIG. 5 illustrates a time change of a traveling speed according to the simulation of FIG. 4. In FIG. 5, a two-dot chain line indicates the traveling speed when the resonance of the drive system is not damped, and the solid line indicates the traveling speed according to the target motor torque added with the target damping torque. It can be seen that pulsation of the traveling speed that appears when the resonance of the drive system is not damped is the resonance of the drive system, and that the traveling speed varies at a substantially constant cycle. On the other hand, it can be seen that the traveling speed that appears when the vehicle travels at the target motor torque added with the target damping torque has a pulsation from the start of traveling until the damping torque offset value becomes steady, but the pulsation, that is, the resonance of the drive system is gradually damped. The broken line in FIG. 5 indicates that the vehicle travels at the target motor torque added with the default damping torque of FIG. 4. In this case, a reached traveling speed is reduced by the acceleration prevention component described above. The above is a description of an action of the target damping torque during acceleration traveling of the vehicle. One skilled in the art would easily understand that an opposite action occurs during deceleration traveling of the vehicle.

In the hybrid vehicle including the CVT 2 disposed in the drive system, the resonance frequency of the drive system changes according to the transmission gear ratio. In the above described manner, the damping control device for the electric vehicle according to the embodiment can extract the resonance component generated in the drive system from the motor revolution speed with the bandpass filter having the resonance frequency band as the pass frequency band, and calculate and set the motor torque having an opposite phase to that of the resonance component, as the default damping torque. Also, while the band-pass motor revolution speed includes the acceleration and deceleration component of the vehicle, the average value of the default damping torque for the predetermined time period for simply damping the resonance component of the drive system is 0 or about 0. Therefore, the damping torque offset value obtained as the average value of the default damping torque for the predetermined time period is a component that prevents the acceleration and deceleration of the vehicle at that time point. Therefore, the value obtained by subtracting the damping torque offset value from the damping torque is the target damping torque that reduces the resonance of the drive system. The resonance of the drive system is damped by achieving the target motor torque added with the target damping torque, without preventing the acceleration and deceleration of the vehicle.

When the predetermined time period for the average value of the damping torque, that is, the predetermined time period for calculating the damping torque offset value is equal to or shorter than ½ of the resonance cycle of the drive system, the damping torque offset value may be calculated simply based on the resonance component on either one of the torsion side and the torsion return side of the elastic element of the drive system. In such a case, the target damping torque obtained by subtracting the damping torque offset value from the damping torque may rather vibrate the drive system. To the contrary, by setting the predetermined time period for the average value of the damping torque, that is, the predetermined time period for calculating the damping torque offset value to be longer than at least ½ of the resonance cycle of the drive system, it is possible to set the average value of the default damping torque for simply damping the resonance component of the drive system to be close to 0. Therefore, the target damping torque capable of surely reducing the resonance of the drive system can be set.

When an absolute value of the calculated and set damping torque offset value is too large, the target damping torque obtained by subtracting the damping torque offset value from the default damping torque may change suddenly. However, such a sudden change of the target damping torque can be prevented by limiting the damping torque offset value within the upper and lower limit values.

The damping control device for an electric vehicle according to the embodiment has been described above. It is noted that the disclosure is not limited to the configuration described in the above embodiment. Various changes may be made within the scope of the disclosure. For example, in the hybrid vehicle of FIG. 1, when an engine 21 having a large mass is coupled to the drive system, the engine 21 functions as, for example, a mass damper, and most of the resonance of the drive system is absorbed by the engine 21. However, by continuously adding the target damping torque to the target motor torque, the resonance between the motor and the drive system can be reduced. As a result, the vibration of the vehicle due to the resonance of the drive system can be surely damped.

The disclosure is similarly applicable to an electric vehicle without an engine. Also, the disclosure is also applicable to a fuel cell vehicle in which a motor is driven by electric power obtained from a fuel cell.

The disclosure can be similarly applied to an electric vehicle including a multi-stage transmission of any type (whether manual or automatic) disposed in the drive system.

According to the disclosure, in the electric vehicle including the transmission disposed in the drive system, the resonance frequency of the drive system changes according to the transmission gear ratio. Therefore, the resonance component generated in the drive system can be extracted from the motor revolution speed with the bandpass filter having a change band of the resonance frequency as the pass frequency band, and the motor torque having an opposite phase to that of the resonance component can be calculated and set as the default damping torque (first calculator). The vibration component passed by the bandpass filter includes the acceleration and deceleration component of the vehicle, while the resonance of the drive system occurs due to the torsion and the torsion return of the elastic element. Thus, an average of the resonance component of the drive system is 0 or about 0. The average value of the default damping torque for the predetermined time period for simply damping the resonance component of the drive system is also 0 or about 0. Therefore, the damping torque offset value obtained as the average value of the default damping torque for the predetermined time period is the component for preventing the acceleration and deceleration of the vehicle at that time point (second calculator). The value obtained by subtracting the damping torque offset value from the damping torque is the target damping torque that reduces the resonance of the drive system. In one embodiment, a third calculator may obtain this value. The resonance of the drive system is damped by achieving the target motor torque added with the target damping torque, without preventing the acceleration and deceleration of the vehicle (controller).

According to the disclosure, the target damping torque capable of surely reducing the resonance of the drive system can be set. That is, when the predetermined time period for the average value of the default damping torque, that is, the predetermined time period for calculating the damping the torque offset value is equal to or shorter than ½ of the resonance cycle of the drive system, the damping torque offset value may be calculated simply based on the resonance component on either one of the torsion side and the torsion return side of the elastic element. In such a case, the target damping torque obtained by subtracting the damping torque offset value from the default damping torque may rather vibrate the drive system. To the contrary, by setting the predetermined time period for the average value of the default damping torque, that is, the predetermined time period for calculating the damping torque offset value to be longer than at least ½ of the resonance cycle of the drive system, it is possible to set the average value of the damping torque for simply damping the resonance component of the drive system to be close to 0. Therefore, the target damping torque capable of surely reducing the resonance of the drive system can be set.

Further, according to the disclosure, the sudden change of the target damping torque can be prevented. When an absolute value of the calculated damping torque offset value is too large, the target damping torque obtained by subtracting the damping torque offset value from the default damping torque may change suddenly. However, such a sudden change of the target damping torque can be prevented by limiting the damping torque offset value within the upper and lower limit values.

As described above, according to the disclosure, even in the electric vehicle including the transmission disposed in the drive system, it is not necessary to obtain a transfer function of a plant model for each transmission gear ratio. It is possible to effectively damp the resonance of a drive system, which is difficult to be absorbed by a motor having a small mass as compared with an engine having a large mass. Accordingly, the riding comfort can be improved without preventing the acceleration and deceleration of the electric vehicle.

The invention claimed is:

1. A damping control device for an electric vehicle, the electric vehicle comprising a motor as a vehicle drive source and a transmission disposed in a drive system between the motor and a drive wheel, the damping control device comprising:
a detector configured to detect a revolution speed of the motor;
a bandpass filter configured to pass a vibration component in a resonance frequency band of the drive system, the vibration component being included in the detected motor revolution speed;
a first calculator configured to calculate a damping torque for damping resonance of the drive system with a motor torque, on a basis of the vibration component passed by the bandpass filter;
a second calculator configured to calculate, as a damping torque offset value, an average value of the calculated damping torque for a predetermined time period;
a third calculator configured to calculate, as a target damping torque of the motor torque, a value obtained by subtracting the calculated damping torque offset value from the calculated damping torque; and
a controller configured to control a drive state of the motor so as to achieve a target motor torque added with the calculated target damping torque.

2. The damping control device according to claim 1, wherein the predetermined time period is a time period longer than ½ of a resonance cycle of the drive system.

3. The damping control device according to claim 2, wherein the calculated damping torque offset value is limited within preset upper and lower limit values.

4. The damping control device according to claim 1, wherein the calculated damping torque offset value is limited within preset upper and lower limit values.

5. A damping control device for an electric vehicle, the electric vehicle comprising a motor as a vehicle drive source and a transmission disposed in a drive system between the motor and a drive wheel, the damping control device comprising:
a detector configured to detect a revolution speed of the motor;
a bandpass filter configured to pass a vibration component in a resonance frequency band of the drive system, the vibration component being included in the detected motor revolution speed; and
circuitry configured to
calculate a damping torque for damping resonance of the drive system with a motor torque, on a basis of the vibration component passed by the bandpass filter,
calculate, as a damping torque offset value, an average value of the calculated damping torque for a predetermined time period,
calculate, as a target damping torque of the motor torque, a value obtained by subtracting the calculated damping torque offset value from the calculated damping torque, and
control a drive state of the motor so as to achieve a target motor torque added with the calculated target damping torque.

* * * * *